United States Patent [19]

Luhm

[11] Patent Number: 5,580,202
[45] Date of Patent: Dec. 3, 1996

[54] CROWNED SOLID RIVET

[75] Inventor: Ralph Luhm, La Habra, Calif.

[73] Assignee: Allfast Fastening Systems, Inc., City of Industry, Calif.

[21] Appl. No.: 422,131

[22] Filed: Apr. 13, 1995

[51] Int. Cl.⁶ ............................ F16B 19/06; B21D 39/00
[52] U.S. Cl. ........................ 411/507; 411/504; 29/524.1
[58] Field of Search .................................... 411/501, 504, 411/505, 506, 507; 29/524.1

[56] References Cited

U.S. PATENT DOCUMENTS

| | | | |
|---|---|---|---|
| 3,927,458 | 12/1975 | Speakman | 411/507 X |
| 4,000,680 | 1/1977 | Briles | 411/507 |
| 4,004,484 | 1/1977 | Speakman | 411/507 |
| 5,273,386 | 12/1993 | Luhm | 411/507 |
| 5,332,349 | 7/1994 | Gerwin | 411/507 |

FOREIGN PATENT DOCUMENTS

| | | | |
|---|---|---|---|
| 872809 | 10/1981 | U.S.S.R. | 411/507 |
| 1120118 | 10/1984 | U.S.S.R. | 411/507 |

Primary Examiner—Neill R. Wilson
Attorney, Agent, or Firm—Blakely, Sokoloff, Taylor & Zafman

[57] ABSTRACT

A rivet which has a flat crown that extends from the head of a rivet. The rivet is typically installed into a workpiece hole which has a countersink. The head has a frusto-conical section that extends from a rivet shank and a cylindrical section that extends from the frusto-conical section. The frusto-conical section sits within a countersink of the workpiece hole. Extending from a top surface of the head is a crown which has a flat end face and a tapered portion that extends from the end face to the top head surface. The crown has a diameter that is smaller than the outer diameter of the head. The flat end face is approximately 0.5 times the diameter of the shank. The crown has a diameter that is approximately 1.25 times the shank diameter. The rivet is deformed by a hammer and an anvil so that the crown becomes flat and the rivet fills the hole of the workpiece. The crown maintains essentially the same diameter during the rivet deformation process so that the deformation forces are transmitted primarily through the shank of the rivet. The rivet head completely fills the workpiece hole without requiring any post-installation shaving process.

6 Claims, 3 Drawing Sheets

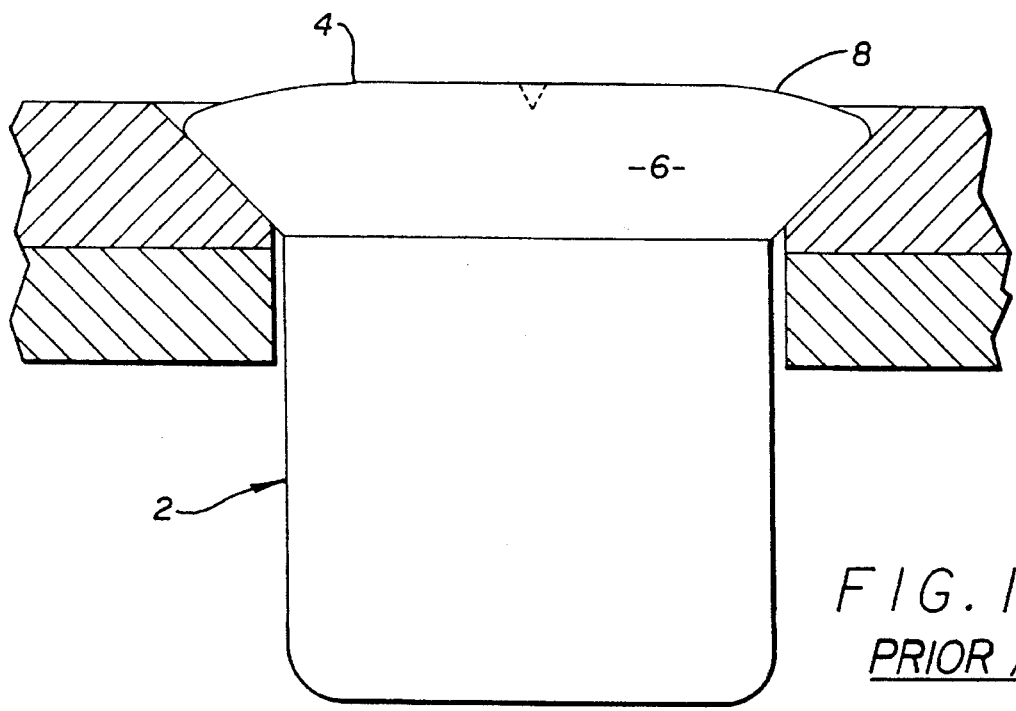
FIG. 1
PRIOR ART
FIG. 2
PRIOR ART
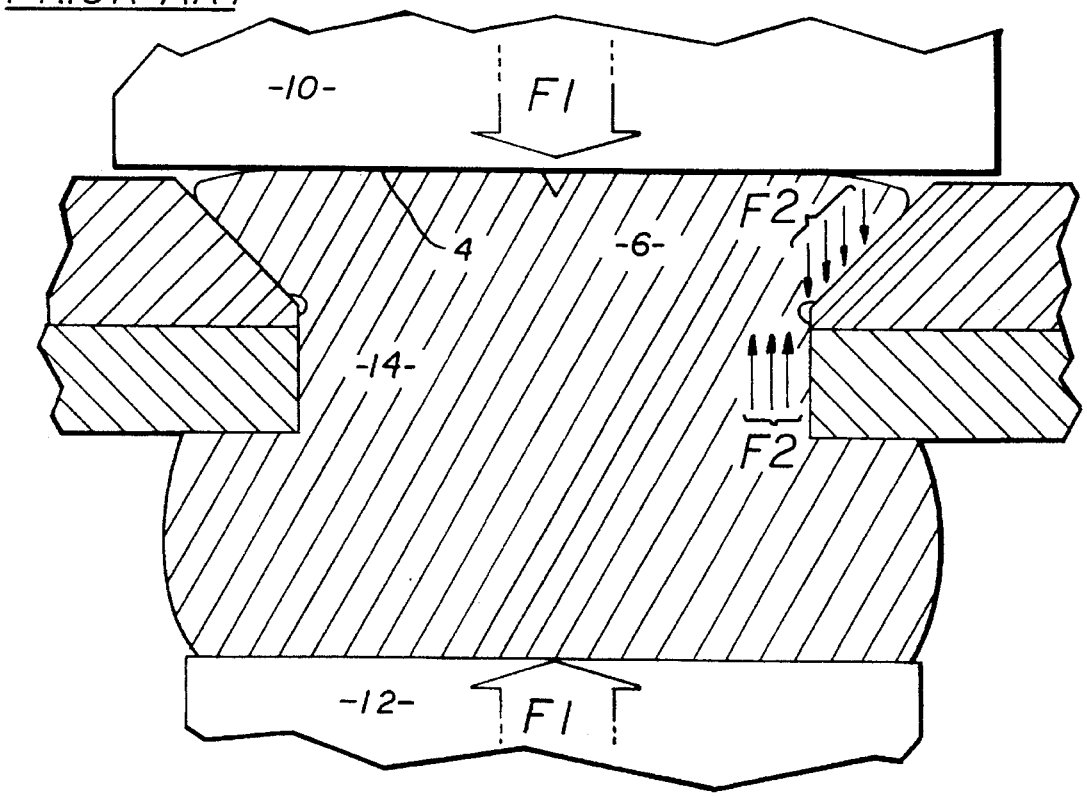

CROWNED SOLID RIVET

FIELD OF THE INVENTION

The present invention relates to a solid rivet fastener.

DESCRIPTION OF RELATED ART

Aircraft are constructed from a number of workpieces that are typically joined together by rivets. For example, rivets typically fasten the skin of an airplane to the aircraft frame. U.S. Pat. No. 4,000,680 issued to Briles discloses a rivet which has a head portion that extends from a cylindrical shank portion. The Briles rivet head includes a cylindrical section and a frusto-conical section that fit within corresponding counterbore and countersink features of the workpiece hole. The head and shank of the rivet are radically expanded within the workpiece hole by a hammer and an anvil. The rivet expansion creates an interference fit between the workpieces and the rivet. To provide additional material for the expansion of the rivet, the head has a dome that is flattened during rivet installation. The Briles dome is shaped as a segment of a sphere which has a diameter that is smaller than the outer diameter of the head.

It is desirable to fill the entire counterbore and countersink of the workpiece hole with rivet material. It has been found that an unfilled hole will have a lower fatigue life than a fully filled hole. An undersized rivet head that is placed within an oversized workpiece hole may produce an unfilled counterbore/countersink. For this reason, the domed portion is provided with a minimum dimension that will insure a filled workpiece hole. The nominal dimensions of the rivet and workpieces may allow a portion of the rivet head to remain above the top workpiece surface after rivet installation. The excess rivet material creates drag on the aircraft. To reduce drag, the excess rivet material is typically shaved from the outer surface of the workpiece.

One disadvantage of the Briles domed rivet is that the hammer may "roll" off-center and apply a non-axial load to the rivet. The non-axial load may create an undesirable deformation of the rivet.

FIG. 1 shows a crowned head rivet 2 that is disclosed in U.S. Pat. No. 3,927,458 issued to Speakman. The Speakman rivet has a flat end face 4 which prevents the hammer from rolling off of the head 6 during installation of the rivet. The crown has a tapered portion 8 that extends from the flat end face 4 to the edge of the rivet. In accordance with the teachings of the Speakman patent, the Speakman rivet head fills the countersunk hole without having to shave off excess material after the rivet is installed.

As shown in FIG. 2, during installation the flat end face 4 increases in diameter as the rivet head is being deformed by the hammer 10 and anvil 12. The hammer 10 and anvil 12 create axial forces F1 on the rivet shank 14. The forces cause the shank 14 and head 6 of the rivet to expand and fill the hole of the workpiece. When the diameter of the end face 4 becomes larger than the diameter of the rivet shank 14, the hammer 10 applies forces F2 that are off-center from the reactive forces of the anvil 12. The forces F2 may cause a rivet deformation which creates a space 16 between the workpiece and rivet at the junction of the head 6 and the shank 14. This space may reduce the fatigue strength of the joint. It would be desirable to provide a rivet which can be deformed to fill the entire workpiece hole without having to shave excess rivet material after the installation process.

SUMMARY OF THE INVENTION

The present invention is a rivet which has a flat crown that extends from the head of a rivet. The rivet is typically installed into a workpiece hole which has a countersink. The head has a frusto-conical section that extends from a rivet shank and a cylindrical section that extends from the frusto-conical section. The frusto-conical section sits within a countersink of the workpiece hole. Extending from a top surface of the head is a crown which has a flat end face and a tapered portion that extends from the end face to the top head surface. The crown has a diameter that is smaller than the outer diameter of the head. The flat end face is approximately 0.5 times the diameter of the shank. The crown has a diameter that is approximately 1.25 times the shank diameter. The rivet is deformed by a hammer and an anvil so that the crown becomes flat and the rivet fills the hole of the workpiece. The crown maintains essentially the same diameter during the rivet deformation process so that the deformation forces are transmitted primarily through the shank of the rivet. The rivet head completely fills the workpiece hole without requiring any post-installation shaving process.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a side view of a rivet of the prior art;

FIG. 2 is a cross-sectional view of the prior art rivet being deformed into a workpiece;

DETAILED DESCRIPTION OF THE INVENTION

Figure 3:
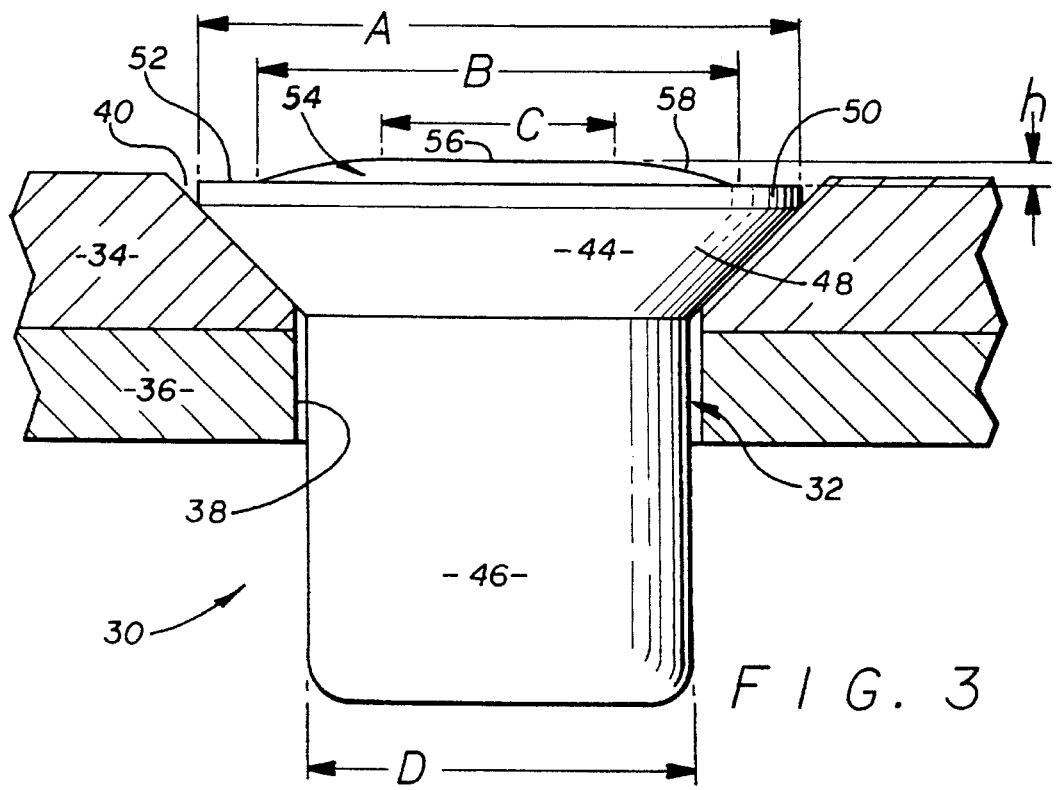
FIG. 3 is a side view of a rivet of the present invention.

Referring to the drawings more particularly by reference numbers, FIG. 3 shows a rivet 30 of the present invention. The rivet 30 extends through the hole 32 of workpieces 34 and 36. By way of example, the workpieces may be the aircraft skin and frame of an airplane. The hole 32 has a cylindrical section 38 and a countersink section 40. The hole 32 is typically formed by a tapping drill (not shown) that drills through the workpieces.

The rivet 30 has a head 44 that extends from a shank 46. The shank 46 is defined by a diameter D. The head 44 is defined by a diameter A. The shank 46 is longer than the combined thicknesses of the workpieces so that the rivet can be upset by an anvil. The head 44 has a frusto-conical section 48 and a cylindrical section 50. The cylindrical section 50 and frusto-conical section 48 have dimensions that correspond to the dimensions of the countersink 40 of the workpiece hole 32. The cylindrical section typically has a maximum outer diameter that is no greater than the minimum upper inner diameter of the countersink, so that the head can be seated within in the hole. Likewise, the shank 46 has a maximum diameter no greater than the minimum diameter of the cylindrical section 38 of the hole.

Extending from a top surface 52 of the head 44 is a crown 54. The crown 54 has a flat end face 56 and a tapered portion 58 that extends from the end face 56 to the top head surface 52. The tapered surface 58 typically has a convex radius.

The crown 54 has a diameter B that is less than the diameter A of the top surface 52. The diameter C of the end face 56 is less than the diameter D of the shank 46. In the preferred embodiment, the crown diameter B is approximately 1.25 times the diameter D of the shank 46, and the flat end face 56 diameter C is approximately 0.5 times the shank diameter D. The crown 54 has a height h that is typically 0.001 inches for every 1/32 inch of shank diameter, or approximately 0.03125 times the shank diameter D. Table I provides preferred dimensions (in inches) for a number of standard tension and shear rivet sizes.

TABLE I

TENSION HEAD CONFIGURATION

| NOM. SHANK DIAMETER D | A DIAMETER | B DIAMETER | C DIAMETER | h BEFORE RIVET DEFORMATION |
| --- | --- | --- | --- | --- |
| 3/32 | .179 | .117 | .047 | .003 |
| 1/8 | .225 | .156 | .062 | .004 |
| 5/32 | .286 | .195 | .078 | .005 |
| 3/16 | .353 | .234 | .094 | .006 |
| 1/4 | .476 | .312 | .125 | .007 |

TABLE II

SHEAR HEAD CONFIGURATION

| NOM. SHANK DIAMETER D | A DIAMETER | B DIAMETER | C DIAMETER | h BEFORE RIVET DEFORMATION |
| --- | --- | --- | --- | --- |
| 3/32 | .146 | .117 | .047 | .003 |
| 1/8 | .193 | .156 | .062 | .004 |
| 5/32 | .245 | .195 | .078 | .005 |
| 3/16 | .295 | .234 | .094 | .006 |
| 1/4 | .394 | .312 | .125 | .007 |

Figure 4:
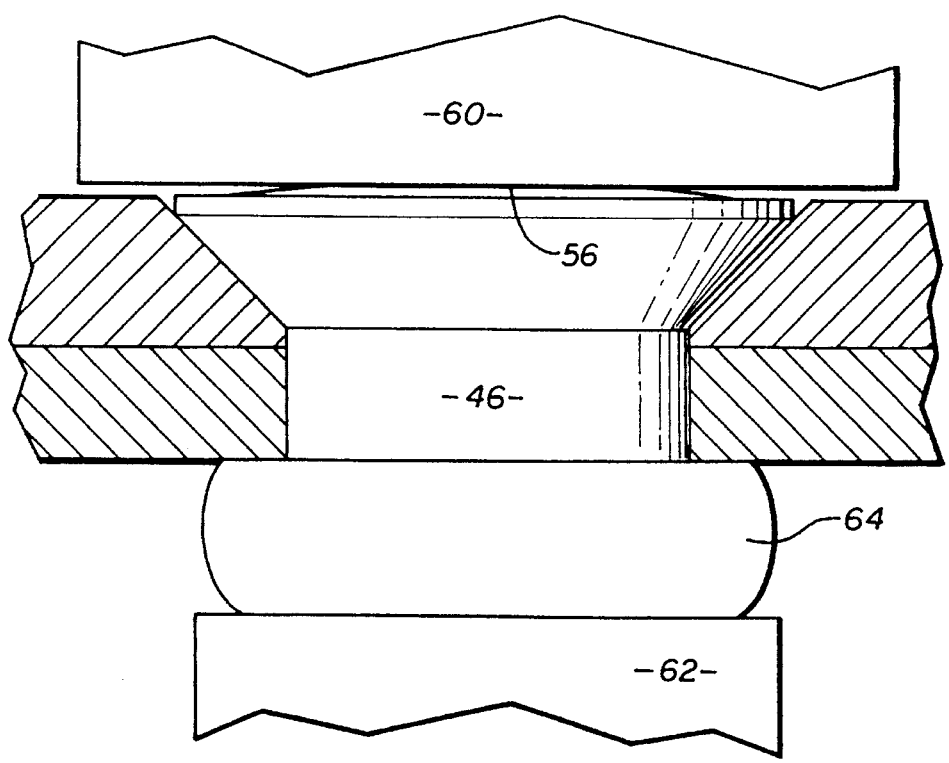
FIG. 4 is a side view of the rivet being deformed within a workpiece.

As shown in FIG. 4, the rivet 30 is installed by placing a hammer 60 adjacent to the end face 56 and an anvil 62 adjacent to the shank 46. The hammer 60 applies a force which deforms the rivet. The end of the shank 46 deforms both radically and axially to create an upset portion 64. The shank 46 also expands radically within the cylindrical section of the hole to create an interference fit with the workpieces.

The head of the rivet expands within the countersink section of the workpiece hole. The additional expanded head material is provided by the crown 54 which is pushed down to the top surface of the head by the hammer 60. The space between the flat end face 56 and the outer edge of the head provides an area for the rivet material to flow, so that the diameter of the crown 54 does not significantly change during the deformation process of the rivet. The relatively constant crown 54 diameter concentrates the axial deformation forces F through the shank of the rivet. This insures that rivet material will expand into the workpieces even at the head/shank junction of the rivet.

Figure 5:
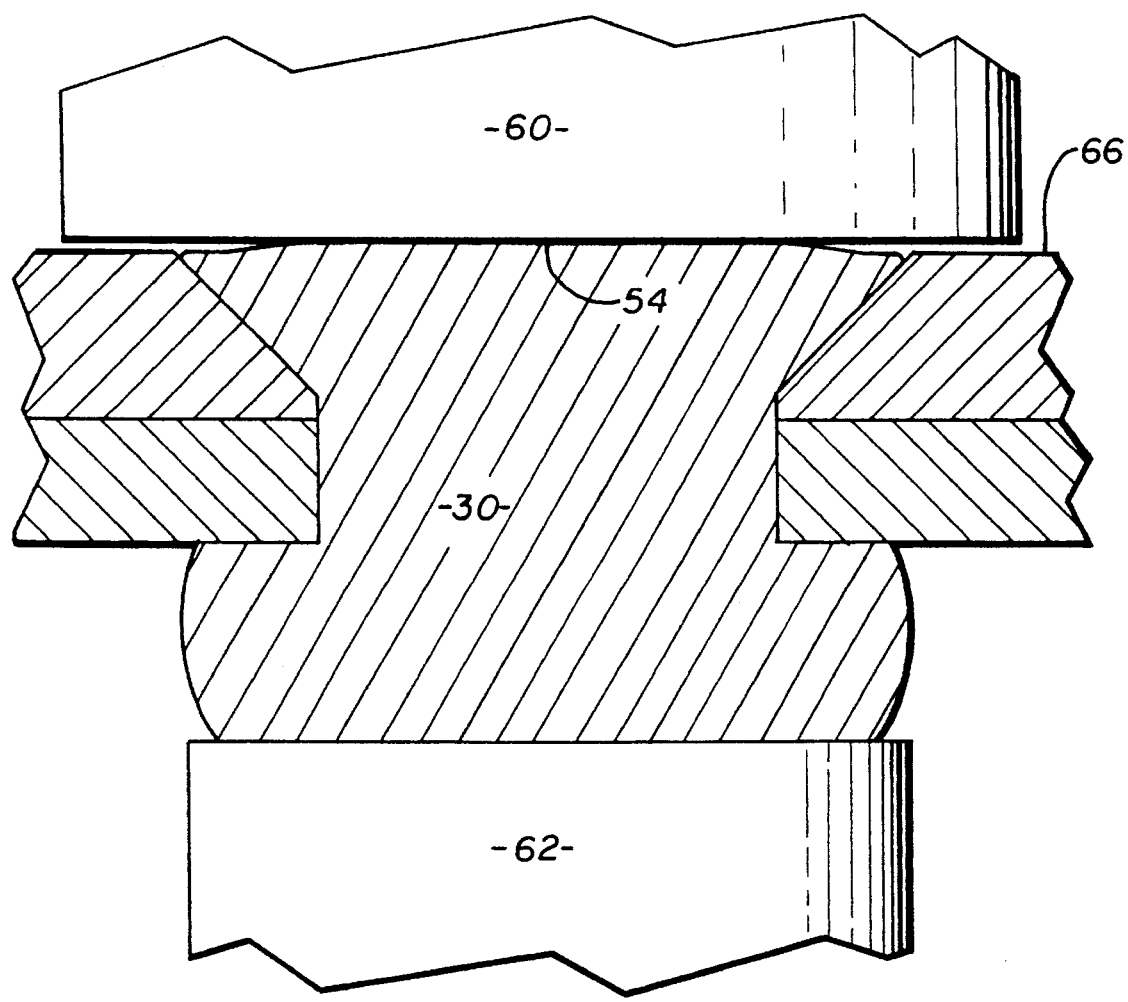
FIG. 5 is a cross-sectional view of the rivet deformed within the workpiece.

As shown in FIG. 5, the hammer 60 continues to deform the rivet 30 until the crown 54 is slightly above the top surface 66 of the workpiece. The hammer 60 remains above the top surface 66 to prevent scratching or otherwise damaging the workpiece. There is no requirement to shave additional material from the installed rivet. The rivet also fully fills the workpiece hole 32, there are no spaces between the rivet and the walls of the workpieces. The lack of voids within the fastener assembly increases the strength and fatigue life of the rivet joint. The present invention thus provides a rivet that fully fills the workpiece hole without requiring any additional post-installation shaving process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A rivet, comprising:

a shank that has a shank diameter; and, a head that extends from said shank, said head having a crown that includes a flat end face and a tapered surface that extends to a top surface of said head, said crown having a crown diameter that is approximately 1.25 times said shank diameter, said flat end face has a diameter that is approximately 0.5 times said shank diameter.

2. The rivet as recited in claim 1, wherein said crown has a height from said top surface that is approximately 0.03 times the shank diameter.

3. The rivet as recited in claim 1, wherein said head has a frusto-conical section that extends from said shank and a cylindrical section that extends from said frusto-conical section.

4. The rivet as recited in claim 1, wherein said tapered surface of said crown has a convex radius.

5. A method for installing a rivet into a workpiece, comprising the steps of:

a) inserting a rivet into a hole of a workpiece, wherein said rivet includes a shank that has a shank diameter and a head that extends from said shank, said head having a crown that includes a flat end face and a tapered surface that extends from said flat end face to a top surface of said head, said crown having a crown diameter that is approximately 1.25 times said shank diameter, said flat end face has a diameter that is approximately 0.5 times said shank diameter; and, b) deforming said rivet to expand said head and said shank and to create an interference fit between the workpiece and said rivet.

6. A method for installing a rivet into a workpiece which has a hole, wherein the hole has a countersink section that is adjacent to a cylindrical section, comprising the steps of:

a) inserting a rivet into the hole of the workpiece, wherein said rivet has a shank that has a shank diameter and which is inserted into the cylindrical section of the hole, a head which has a cylindrical section and a frusto-conical section that is inserted into the countersink section of the hole, said head having a crown that includes a flat end face and a tapered surface that extends from said flat end face to a top surface of said head, said crown having a crown diameter that is approximately 1.25 times said shank diameter, said flat end face has a diameter that is approximately 0.5 times said shank diameter; and, b) deforming said rivet to expand said head and said shank and to create an interference fit between the workpiece and said rivet.

* * * * *